Patented Sept. 9, 1930

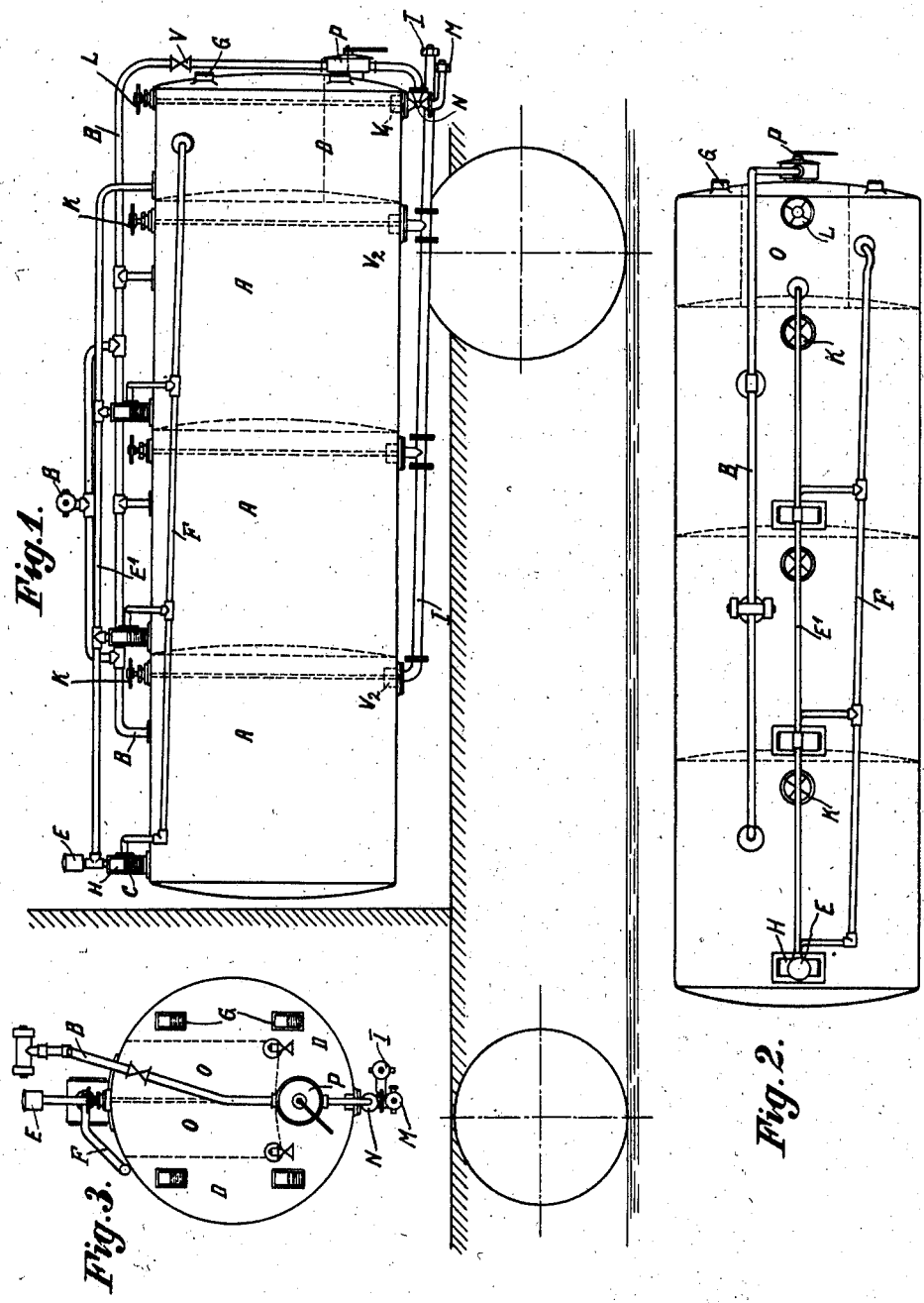

1,775,484

UNITED STATES PATENT OFFICE

ERNST BRAINICH, OF WANDSBEK, NEAR HAMBURG, GERMANY

TANK FOR TRANSPORTATION OF VOLATILE LIQUIDS

Application filed February 8, 1928, Serial No. 252,874, and in Germany June 30, 1927.

Tank wagons or cars for the transportation and delivery of volatile liquids such as benzine, benzol or mixtures of spirits or the like, as heretofore constructed, have had the disadvantage of being provided with no means for counteracting the effect of temperatures on the outside of the tank, whereby the predetermined quantities to be delivered are affected, in consequence of which the consumer to be supplied has been liable to receive from the supplier a less quantity of liquid to be supplied than that of the predetermined quantity originally charged into the tank.

The object of the present invention is to provide means whereby any such loss or depreciation of the contents of the tank may be made up to the desired quantity preparatory to the delivery thereof. A tank wagon or car constructed in accordance with the present invention is shown diagrammatically in the accompanying drawings in which:—

Figure 1 is an elevation,
Figure 2 a plan view, and
Figure 3 a rear view of the tank.

The reservoir A of the tank car in the example illustrated is divided into three similar compartments that are filled by the pipe B. Each chamber A is provided with a neck-like dome H at its highest point having two laterally disposed gauge glasses on which is inscribed divisional lines or the gauge mark C, and which carries the vent pipes E and E', the latter being connected to the top of the auxiliary chamber D.

The tank or each chamber A is filled with the liquid to be consumed, or delivered to the consumer, up to the gauge mark C when the car is in its horizontal position. The surplus of the fluid or liquid will run off into the auxiliary chamber D by the overflow pipe F, the lower edge, of which branches off the dome H at the height of the gauge mark C.

When the divers tank chambers A are filled with different kinds of fluid each tank chamber is provided with a special auxiliary chamber.

By way of example in the drawing three tank chambers A are shown which are intended to be filled with the same liquid so that only one auxiliary chamber D is needed. The gauge glass G provided with measuring lines or a float indicate quantity of liquid in the auxiliary chamber D which will allow of the filling up of the chambers A to such an amount as may be required for compensating any losses of the fluid during the transit.

Towards the bottom of the auxiliary chamber D a pump P is mounted having a suction and delivery pipe, the latter being provided with a cock or valve V by means of which the required amount of liquid can be forced into the feed pipe B to the individual chambers A.

By observing the lines or gauge mark on the domes H and the overflow, it will be easy and convenient to fill in such an amount of liquid to ensure the desired quantity for delivery.

A pipe I serves for emptying the chambers A, controlling valves $V_2$ governing the outlet from each, said valves being operable by the hand wheels K. For emptying the auxiliary chamber D, by the aid of the valve $V_1$ operable by the hand wheel L, a pipe M is provided that carries a three-way cock or valve D from which branches the suction pipe to the pump P and the emptying pipe M.

I claim:—

1. A tank vehicle including in combination a storage tank open to the atmosphere and an auxiliary tank functioning as an independent compartment for liquid, an overflow pipe from said storage tank to said auxiliary tank and means for replenishing said storage tank from said auxiliary tank.

2. A tank vehicle including in combination a storage tank and an auxiliary tank connected by an overflow pipe from said storage tank, the latter tank being provided with a calibration adjacent said overflow pipe by means of which the exact contents of said tank when filled may be ascertained, and a pump for replenishing to said storage tank from said auxiliary tank the amount of liquid by which said storage tank may have become depleted.

3. A tank vehicle including in combination a vented storage tank and an auxiliary tank connected by an overflow pipe from said storage tank, the latter tank being provided with a calibration adjacent said overflow pipe by means of which the exact contents of said tank when filled may be ascertained, and a pump for replenishing to said storage tank from said auxiliary tank the amount of liquid by which said storage tank may have become depleted.

4. A tank vehicle including in combination a storage tank segregated into a number of compartments, and an auxiliary tank, an overflow pipe connecting said compartments with said auxiliary tank, said compartments being provided with a calibration adjacent said overflow pipe by means of which the exact quantity of liquid contained in said compartments when filled, may be ascertained, and a pump for replenishing to said compartments from said auxiliary tank the amount of liquid by which said compartments may have become depleted.

In testimony whereof I have signed my name to this specification.

ERNST BRAINICH.